United States Patent [19]

Wu

[11] Patent Number: 5,819,781

[45] Date of Patent: Oct. 13, 1998

[54] PUMPING DEVICE WITH A PIVOTAL LEVER FOR VARIOUS VALVES

[76] Inventor: Scott Wu, No. 2, Lane 296, Ming Sheng Road, Wufeng Hsiang, Taichung Hsien, Taiwan

[21] Appl. No.: 901,761

[22] Filed: Jul. 28, 1997

[51] Int. Cl.⁶ .............................. F16K 15/20; F16L 29/02
[52] U.S. Cl. ............................................ 137/231; 137/223
[58] Field of Search ....................................... 137/223, 231

[56] References Cited

U.S. PATENT DOCUMENTS

| | | | |
|---|---|---|---|
| 2,237,559 | 4/1941 | Jenne | 137/231 |
| 3,926,205 | 12/1975 | Gourlet | 137/231 |
| 5,379,796 | 1/1995 | Wang | 137/231 |
| 5,666,990 | 9/1997 | Wu | 137/223 |
| 5,749,392 | 5/1998 | Glotin | 137/231 |

FOREIGN PATENT DOCUMENTS

| | | | |
|---|---|---|---|
| 423516 | 7/1947 | Italy | 137/231 |

Primary Examiner—John Rivell
Assistant Examiner—Meredith Schoenfeld
Attorney, Agent, or Firm—Charles E. Baxley, Esq.

[57] ABSTRACT

A pumping device includes a main body having a passage defined therein through which air passes and a head connected to the main body. A retainer is slidably received in the head and includes a first compartment defined therein for receiving a spring. An end of the retainer includes a conical recess defined therein. A nozzle is slidably mounted in the end of the retainer and includes an end attached to the spring. A nozzle head is securely mounted in an end of the head and includes a second compartment defined therein and in communication with the first compartment via the nozzle. The nozzle head includes a hollow conical section for engaging with the conical recess of the retainer. A lever is provided for switching the retainer between a first operative position in which the first compartment communicates with the passage and a second inoperative position in which the first compartment does not communicate with the passage.

9 Claims, 7 Drawing Sheets

PUMPING DEVICE WITH A PIVOTAL LEVER FOR VARIOUS VALVES

BACKGROUND OF THE INVENTION

1. Field of the Invention

The present invention relates to a pumping device which includes a pivotal lever for various valves.

2. Description of the Related Art

Various pumping devices have heretofore been provided for inflating bicycle tires. Since there are many kinds of valves for bicycle tires, e.g., French valve, Japanese valve, and American valve, a so-called "double head" type pump with a switch means have been proposed to be used on these different valves. Nevertheless, the conventional pumping devices often have complicated structures and require troublesome operation to suit different valves. The present invention is intended to provide an improved design which can be used on various valves by simple operation.

SUMMARY OF THE INVENTION

A pumping device in accordance with the present invention comprises a main body having a passage defined therein through which air passes and a head connected to the main body. A retainer is slidably received in the head and includes a first compartment defined therein for receiving a spring. An end of the retainer includes a conical recess defined therein. A nozzle is slidably mounted in the end of the retainer and includes a first end attached to the spring and a second end.

A nozzle head is securely mounted in an end of the head and includes a second compartment defined therein and in communication with the first compartment via the nozzle. The nozzle head includes a hollow conical section for engaging with the conical recess of the retainer. The pumping device further includes means for switching the retainer between a first operative position in which the first compartment communicates with the passage and a second inoperative position in which the first compartment does not communicate with the passage.

In an embodiment of the invention, the retainer includes a transverse hole for communicating the first compartment and the passage. The retainer may further include an O-ring mounted in an outer periphery thereof.

In a preferred embodiment of the invention, the switching means includes a lever pivotally mounted to a first end of the head. The first end of the head may include two spaced lugs for pivotally mounting the lever.

An outer cap may be securely mounted to the head to secure the nozzle head in position, and the outer cap includes an opening through which a valve of a bicycle tire is extended into the second compartment for inflation purpose.

In a modified embodiment of the invention, the end of the retainer includes a jacket mounted around the conical section of the nozzle head. The jacket includes an elastic sleeve formed therearound and thus defines an annular space therebetween, and the first end of the nozzle includes a notch for releasably receiving an engaging section of the sleeve.

Other objects, advantages, and novel features of the invention will become more apparent from the following detailed description when taken in conjunction with the accompanying drawings.

DESCRIPTION OF THE PREFERRED EMBODIMENTS

Figure 1:
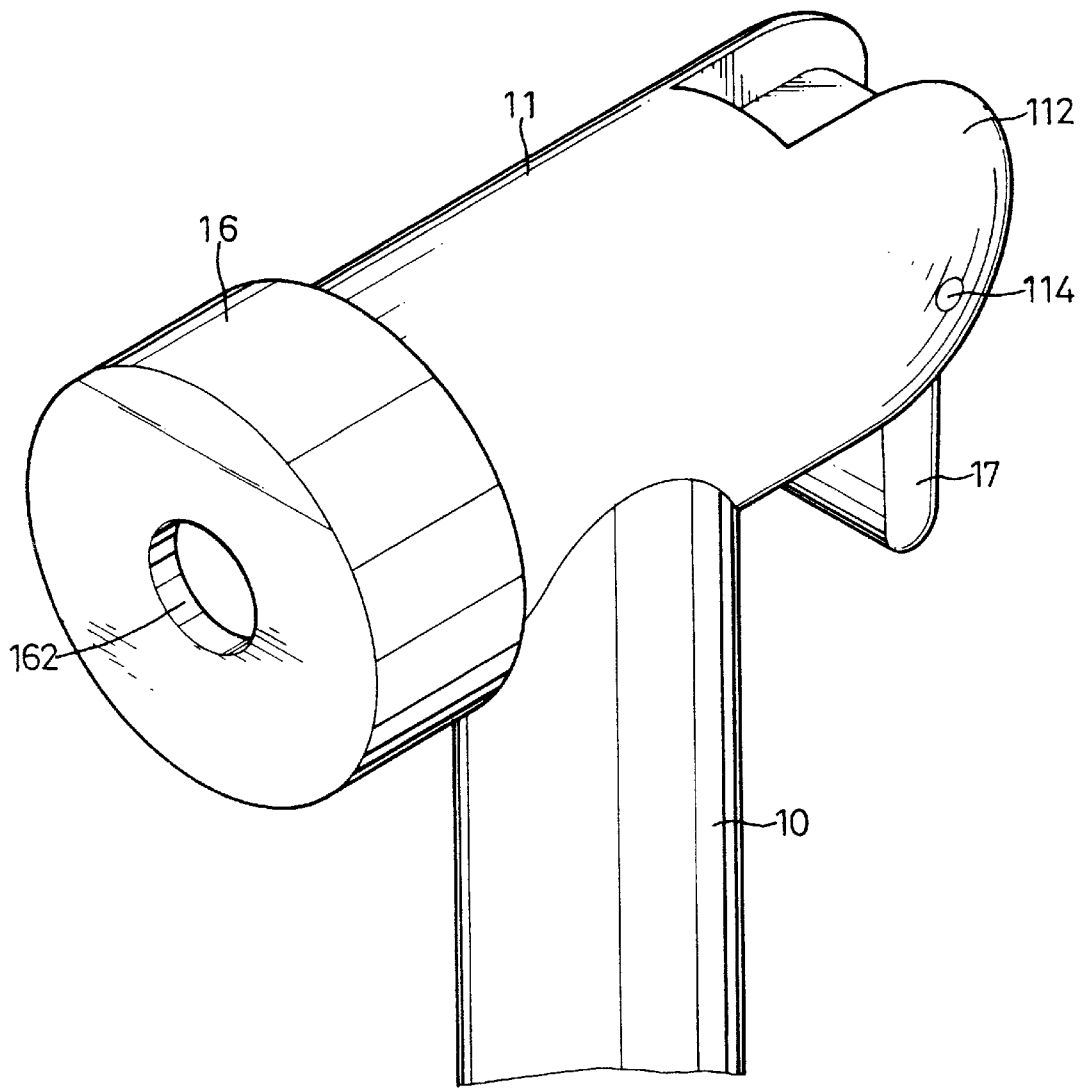
FIG. 1 is a perspective view of a pumping device in accordance with the present invention.
Figure 2:
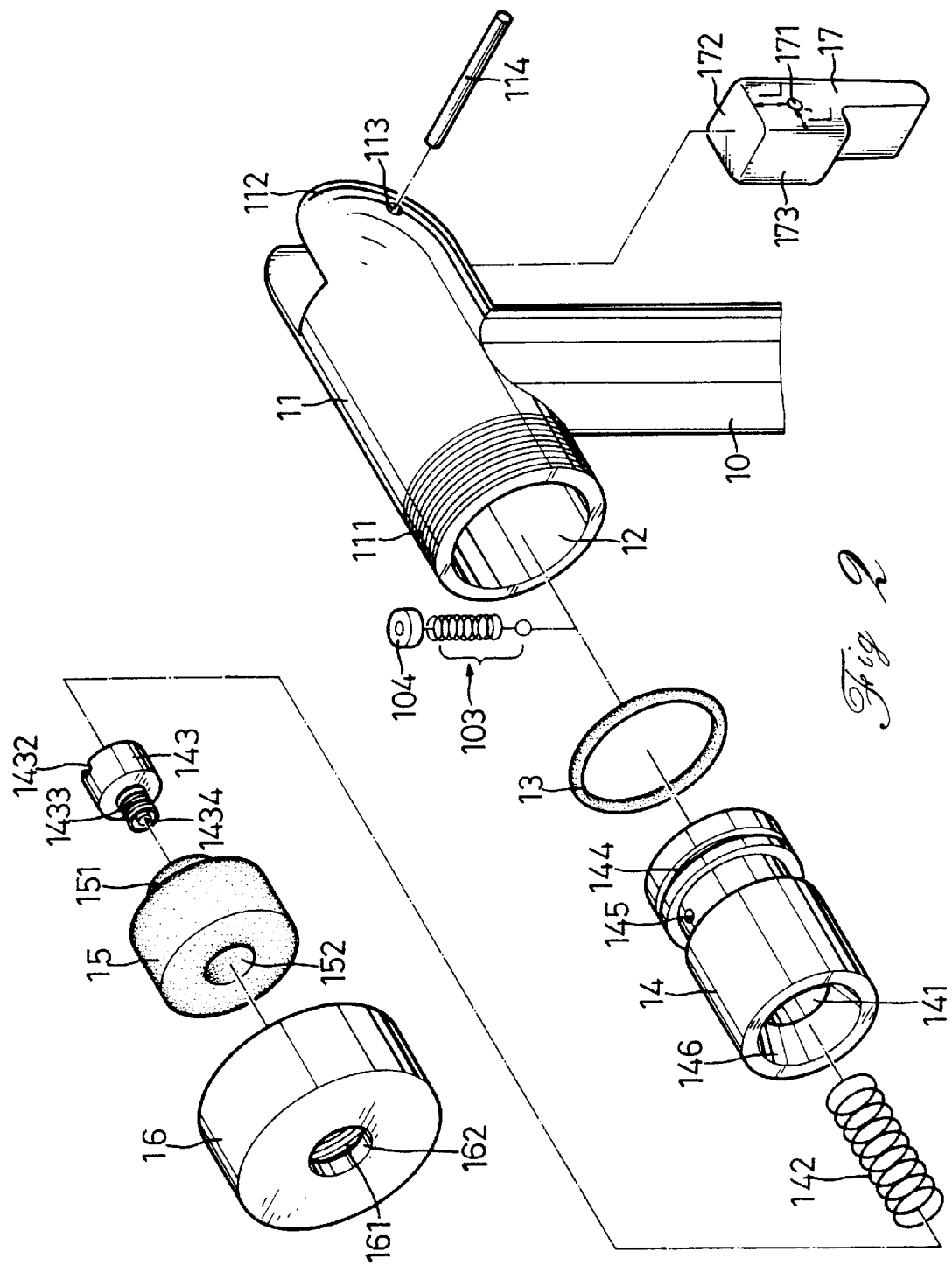
FIG. 2 is an exploded perspective view of the pumping device in accordance with the present invention.
Figure 3:
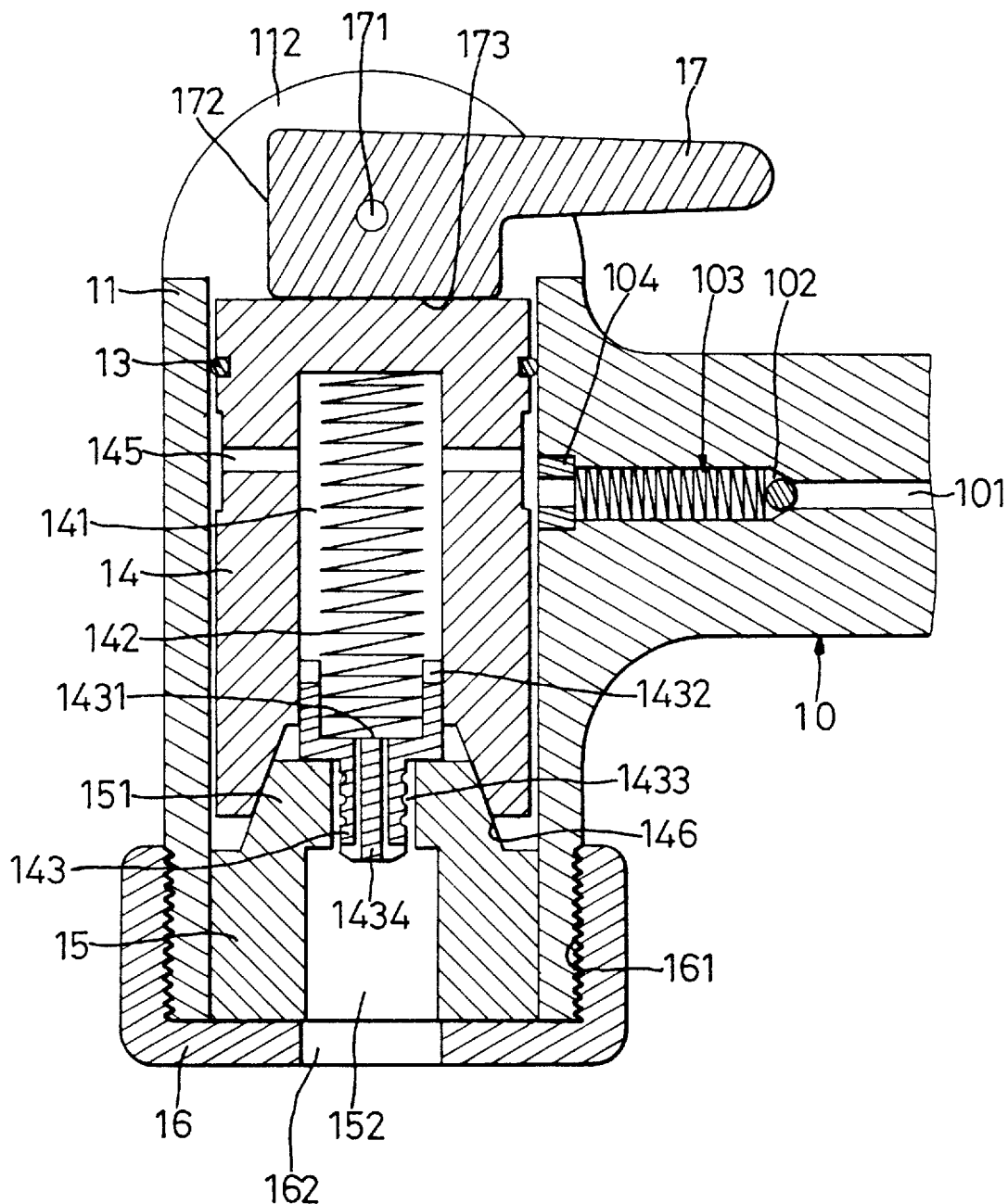
FIG. 3 is a cross sectional view of the pumping device.

Referring to the drawings and initially to FIGS. 1 to 3, a pumping device for bicycle tires in accordance with the present invention generally includes a main body 10 having a passage 101 defined therein and a head 11 connected to the main body 10. It is appreciated that the passage 101 is communicated to a chamber (not shown) which receives a piston (not shown) therein for pumping air into the passage 101. Structure of the piston and the chamber and operation of the piston are conventional and therefore not described in detail.

As shown in FIG. 3, the passage 101 includes a check valve 103 mounted therein such that air is only flowable from the passage 101 to the head 11. In this embodiment, the passage 101 includes an enlarged section 102 adjacent to the head 11, and the check valve 103 includes a spring, a ball, and a holed cap 104 to which the spring (not labeled) bears against. The head 11 includes two lugs 112 formed on a first end thereof, and a pin 114 is extended through a pin hole 113 defined in each lug 112, thereby pivotally mounting a lever 17 between the lugs 112.

A retainer 14 is slidably received in the head 11 and includes a transverse hole 145 defined therein. The retainer further includes an annular groove 144 for receiving an O-ring 13 so as to provide a sealing effect, best shown in FIG. 3. The retainer 14 further includes a compartment 141 which communicates with the transverse hole 145 and which receives a spring 142 and a nozzle 143 therein. The retainer 14 further includes a conical recess 146 defined in an end thereof.

The nozzle 143 includes a recess 1431 (FIG. 3) defined in a first end thereof for receiving an end of the spring 142. The first end of the nozzle 143 further includes a notch 1432 defined therein, and a second end of the nozzle 143 includes a plurality of annular grooves 1433 defined in an outer periphery thereof and a needle 1434 therein. As shown in FIG. 3, the second end of the nozzle 143 extends in the conical recess 146 of the retainer 14.

A nozzle head 15, preferably of plastic material, is mounted in a second end of the head 11 and includes a compartment 152 which communicates with the compartment 141 of the retainer 14 and which may receive a valve of a bicycle tire which will be further described later. The nozzle head 15 further includes a conical section 151 having an outer curvature complimentary to an inner curvature of the conical recess 146 of the retainer 14 so as to be fittingly received in the conical recess 146. As shown in FIG. 3, the conical section 151 is hollow so as to allow the second end of the retainer 14 to extend.

An outer cap 16 is mounted to enclose the second end of the head 11 by threading engagement 161, 111. The outer cap 16 includes an opening 162 defined therein through which the valve of the bicycle may pass. The lever 17 is pivotally mounted between the lugs 112, in which a distance L between a pin hole 171 and an end face 172 (FIG. 2) is smaller than a distance L' between the pin hole 171 and a lateral face 173.

Figure 4:
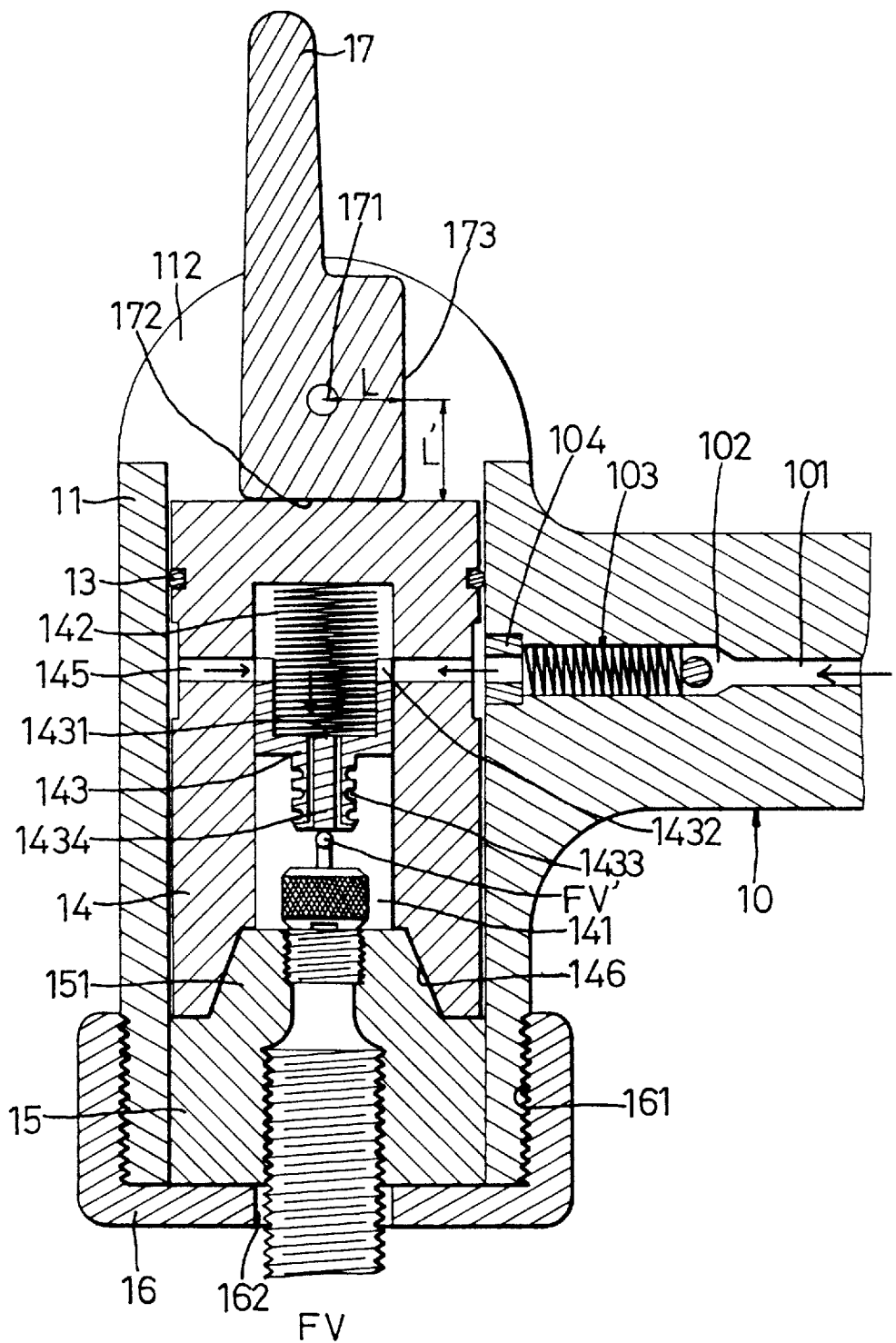
FIG. 4 is a cross sectional view illustrating operation of the pumping device on a French valve.

In operation, referring to FIGS. 3 and 4, when pumping a tire (not shown) via a French valve FV, the French valve FV is extended into the compartment 152, and the lever 17 is pivoted, e.g., counterclockwise through 90 degrees. Since L' is greater than L, the retainer 14 is moved toward the French valve FV by a distance L'–L, such that the conical recess 146 of the retainer 14 is completely filled by the conical section 151 of the nozzle head 15, while the transverse hole 145 aligns with the passage 101, best shown in FIG. 4. In addition, the nozzle 143 contacts with a needle FV' of the French valve FV. Air from the passage 101 (under reciprocating motion of the above-mentioned piston) enters the French valve FV via the transverse hole 145 and the nozzle 143. During the inflation procedure, the French valve FV is tightly clamped by the elastic nozzle head 15. The annular grooves 1433 may provide increased secure engagement with the conical section 151 of the nozzle head 15.

Figure 5:
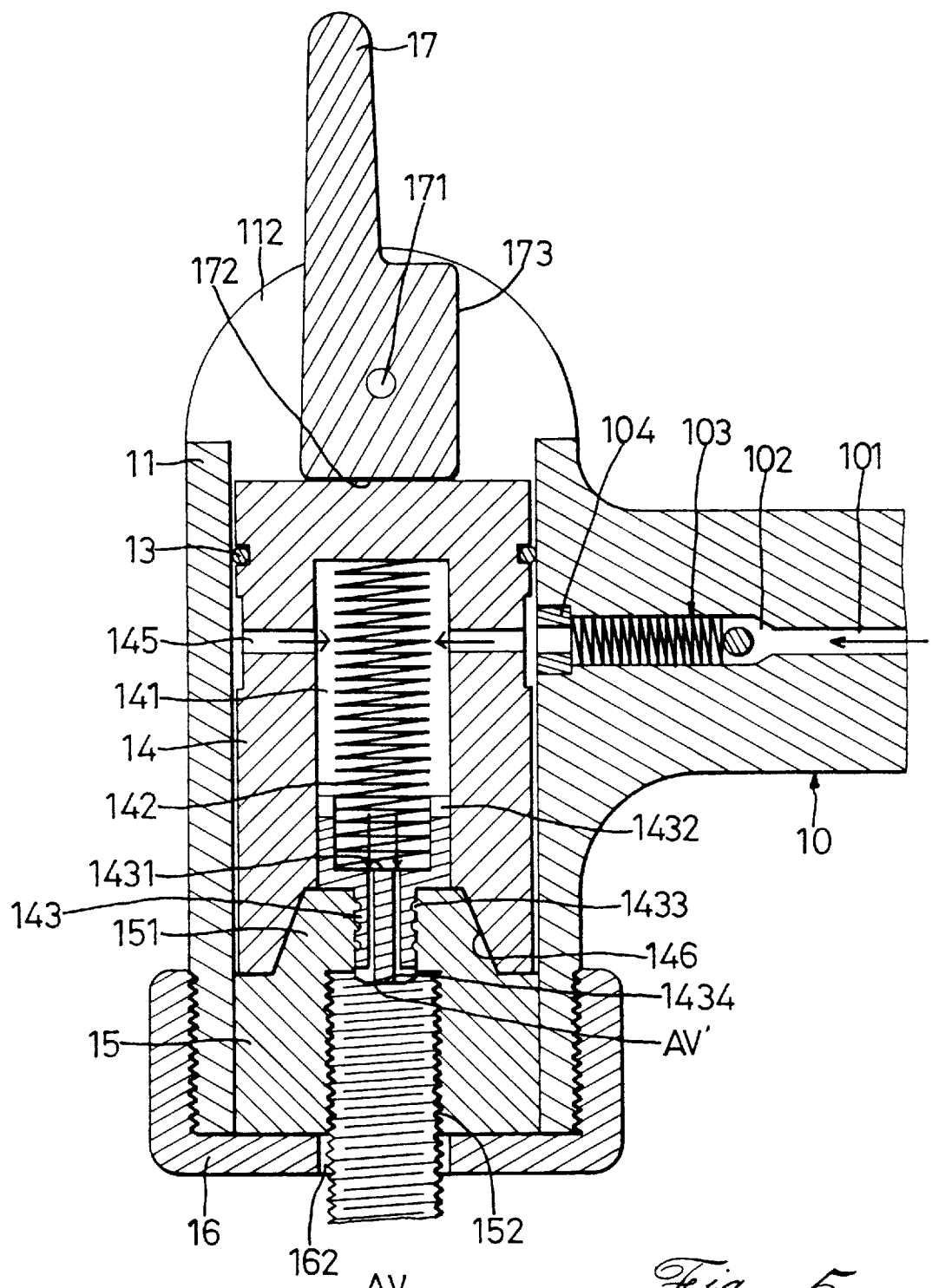
FIG. 5 is a cross sectional view illustrating operation of the pumping device on an American valve.

Referring to FIG. 5, when pumping a tire (not shown) via an American valve AV, the American valve AV is extended into the compartment 152, and the lever 17 is firstly pivoted, e.g., counterclockwise through 45 degrees at which position the nozzle 143 engages with a needle AV' of the American valve AV under the action of the retainer 14 and the spring 142. The lever 17 is then further pivoted through another 45 degrees to a position shown in FIG. 5 in which the nozzle 143 and the needle AV' move downwardly to open the American valve, while the transverse hole 145 aligns with the passage 101. Again, air from the passage 101 enters the American valve AV via the transverse hole 145 and the nozzle 143. During the inflation procedure, the American valve AV is tightly clamped by the plastic nozzle head 15.

Figure 6:
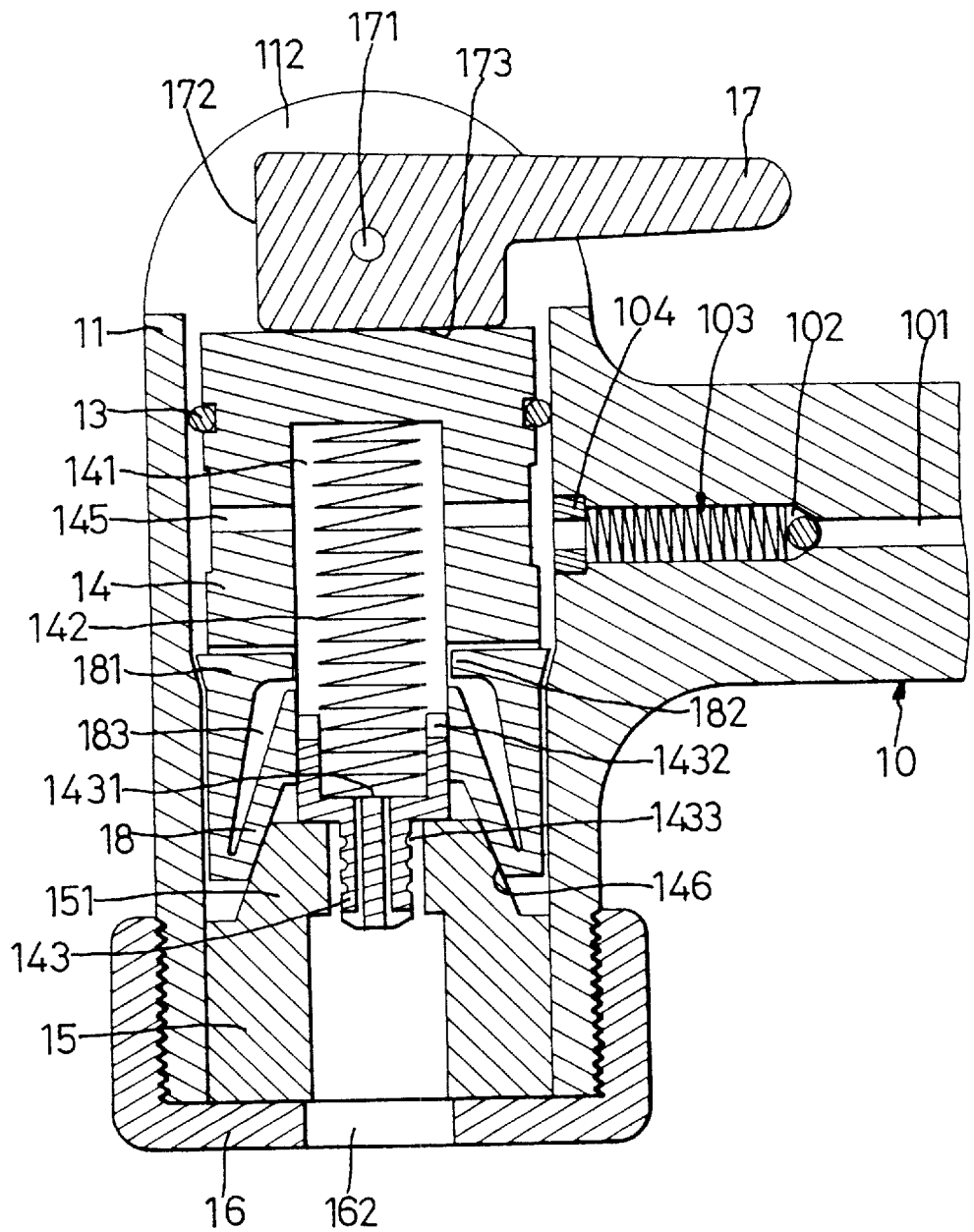
FIG. 6 is a cross sectional view illustrating a modified embodiment of the pumping device in accordance with the present invention.

FIG. 6 illustrates a modified embodiment of the invention, in which the retainer ring 14 is shorter than that of the embodiment in FIG. 3, and further includes a jacket 18 mounted around the nozzle head 15. The jacket 18 includes an elastic sleeve 181 formed therearound and thus defines an annular space 183 therebetween.

Figure 7:
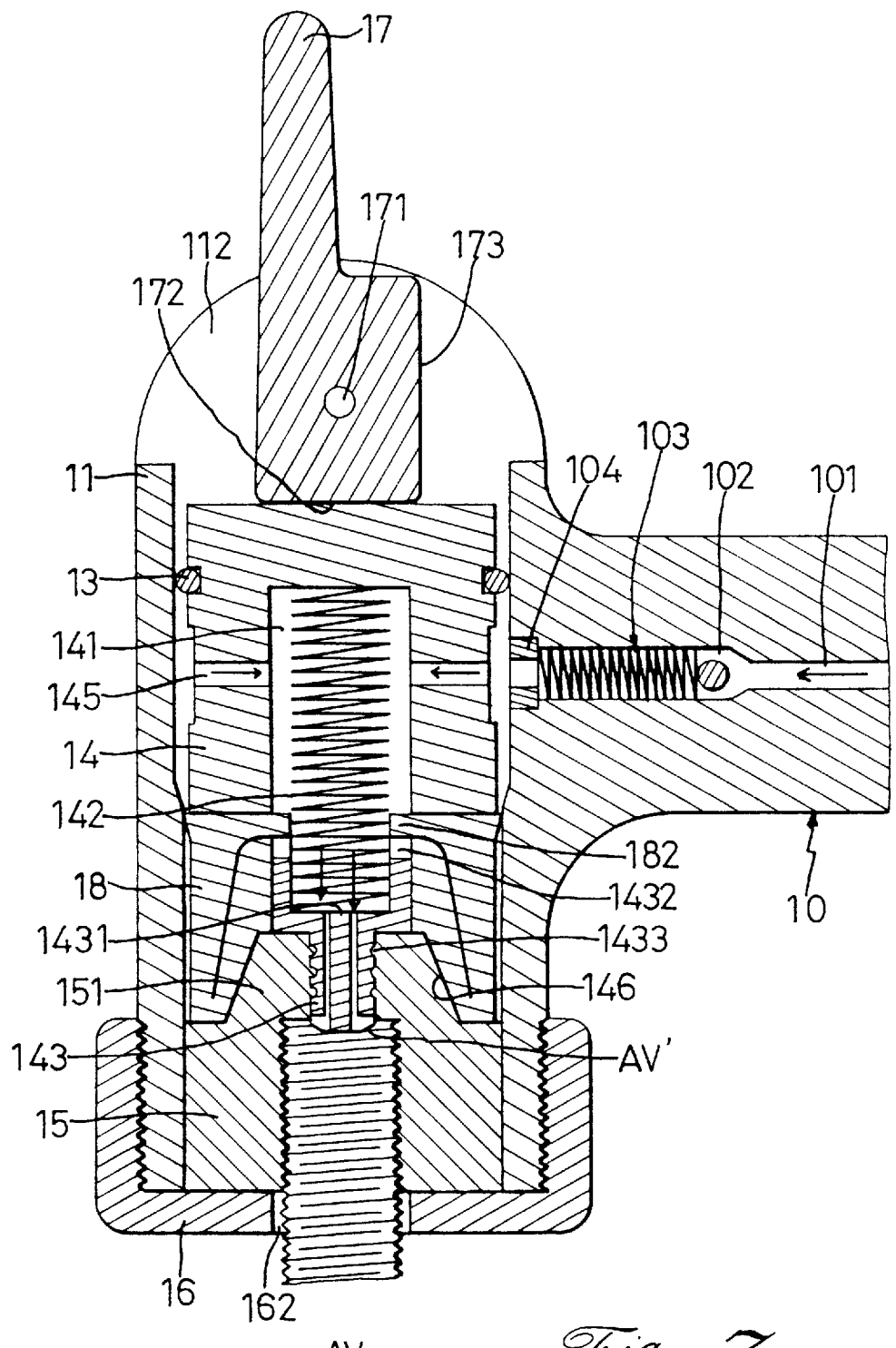
FIG. 7 is a cross sectional view illustrating operation of the pumping device in FIG. 6 on a French valve.

In use, referring to FIG. 7, when pumping a tire (not shown) via an American valve AV, the American valve AV is extended into the compartment 152, and the lever 17 is pivoted, e.g., counterclockwise through 90 degrees. The retainer 14 urges the jacket 18 to move toward the American valve AV, and an engaging section 182 of the elastic sleeve 181 engages with the notch 1432 of the nozzle 143. During pumping, air from the passage 101 enters the American valve AV via the transverse hole 145 and the nozzle 143. During the inflation procedure, the plastic nozzle head 15 and the jacket 18 expand inwardly to tightly clamp the American valve AV. After inflation and after removal of the American valve AV, the jacket 18 and the nozzle head 15 return to their initial positions. Operation of the pumping device on a French valve FV is similar and therefore and redundantly described.

According to the above description, it is appreciated that the pumping device may be used on various valves by simple operation of the same lever.

Although the invention has been explained in relation to its preferred embodiment, it is to be understood that many other possible modifications and variations can be made without departing from the spirit and scope of the invention as hereinafter claimed.

What is claimed is:

1. A pumping device comprising:

a main body having a passage defined therein through which air passes, a head connected to the main body and includes a first end and a second end, a retainer slidably received in the head and including a first compartment defined therein, a first end, and a second end, the second end of the retainer including a conical recess defined therein, a spring being mounted in the first compartment, a nozzle: being slidably mounted in the second end of the retainer and including a first end attached to the spring and a second end, a nozzle head securely mounted in the second end of the head and including a second compartment defined therein and in communication with the first compartment via the nozzle, the nozzle head including a hollow conical section for engaging with the conical recess of the retainer, and means for switching the retainer between a first operative position in which the first compartment communicates with the passage and a second inoperative position in which the first compartment does not communicate with the passage.

2. The pumping device according to claim 1, wherein the retainer includes a transverse hole for communicating the first compartment and the passage.

3. The pumping device according to claim 1, wherein the retainer further includes an O-ring mounted in an outer periphery thereof.

4. The pumping device according to claim 1, wherein the switching means includes a lever pivotally mounted to the first end of the head.

5. The pumping device according to claim 1, wherein the first end of the head includes two spaced lugs for pivotally mounting the lever.

6. The pumping device according to claim 1, wherein the passage includes a check valve mounted therein such that air is only flowable from the passage to the compartment.

7. The pumping device according to claim 1, wherein the second end of the nozzle includes a plurality of annular grooves defined in an outer periphery thereof.

8. The pumping device according to claim 1, further comprising an outer cap securely mounted to the second end of the head to secure the nozzle head in position, the outer cap including an opening.

9. The pumping device according to claim 1, wherein the second end of the retainer includes a jacket mounted around the conical section of the nozzle head, the jacket includes an elastic sleeve formed therearound and thus defines an annular space therebetween, the sleeve includes an engaging section, and the first end of the nozzle includes a notch for releasably receiving the engaging section of the sleeve.

* * * * *